US008000991B2

(12) United States Patent
Montagut

(10) Patent No.: US 8,000,991 B2
(45) Date of Patent: Aug. 16, 2011

(54) ENABLING PERVASIVE EXECUTION OF WORKFLOWS

(75) Inventor: Frederic Montagut, Antibes (FR)

(73) Assignee: SAP AG, Walldorf (DE)

( * ) Notice: Subject to any disclaimer, the term of this patent is extended or adjusted under 35 U.S.C. 154(b) by 1099 days.

(21) Appl. No.: 11/512,462

(22) Filed: Aug. 29, 2006

(65) Prior Publication Data

US 2007/0073570 A1 Mar. 29, 2007

(51) Int. Cl.
*G06Q 10/00* (2006.01)

(52) U.S. Cl. ........................................... 705/7.27; 705/8

(58) Field of Classification Search .............. 705/8, 7.27
See application file for complete search history.

(56) References Cited

U.S. PATENT DOCUMENTS

| | | | | |
|---|---|---|---|---|
| 7,065,493 | B1 * | 6/2006 | Homsi | 705/7.26 |
| 2003/0120776 | A1 * | 6/2003 | Avvari et al. | 709/225 |
| 2004/0230636 | A1 * | 11/2004 | Masuoka et al. | 708/800 |
| 2005/0080768 | A1 * | 4/2005 | Zhang et al. | 707/3 |
| 2006/0020948 | A1 * | 1/2006 | Carr et al. | 719/318 |
| 2006/0143611 | A1 * | 6/2006 | Sadiq | 718/100 |

OTHER PUBLICATIONS

Lakhal et al., A Simulation System of THROWS Architecture for WS-SAGAS, 14th Proceeding of the IEICE Data Engineering Workshop, Mar. 2004 (DEWS2004), pp. 7-B-4 (online reprint p. 1-8).*

Lakhal et al., THROWS: An Architecture for Highly Available Distributed Execution of Web Services Compositions, 14th International Workshop on Research Issues on Data Engineering (RIDE '04), Boston, MA, Mar. 28-29, 2004, p. 103-110.*

Peachavanish, Geointerpret: An Ontological Engineering Methodology for Automated interpretation of Geospatial Queries, University of Pittsburgh, 2004, p. 1-123.*

Andrews et al., Business Process Execution Language for Web Services, Version 1.1, May 5, 2003, p. 1-136.*

Curbera et al., The Next Step in Web Services, Communciations of the ACM, vol. 44, No. 10, Oct. 2003, p. 29-34.*

Ranganathan and McFaddin, Using Workflows to Coordinate Web Services in Pervasive Computing Environments, Proceedings of the IEEE International Conference on Web Services (ICWS '04), p. 1-8.*

Cheshire et al., Dynamic Configuration of IPv4 Link-Local Addresses, Network Working Group, http://www.ietf.org/rfc/rfc3927.txt, May 2005, p. 1-21.*

"BPEL activity to dynamically look-up and assign service endpoints at runtime", *IP.com Journal*, (Apr. 11, 2005),2 pgs.

"European Search Report for application No. 0529.1996.6-2211", (Mar. 28, 2006).

(Continued)

*Primary Examiner* — Justin M Pats

(74) *Attorney, Agent, or Firm* — Schwegman, Lundberg & Woessner, P.A.

(57) ABSTRACT

To allow workflow execution on a plurality of local devices such as in a pervasive environment in a decentralized manner, the present application proposes a method and architecture for executing a workflow on a device, the workflow comprising one or more task activities ($t_n$) comprising actions performed by devices participating in the workflow and routing activities ($r_{in}$) used to transfer control and data between devices, wherein the method comprises the operations of:

receiving a message representing an incoming routing activity ($r_{ij}$);

generating from the workflow a local part ($W_n$) to be executed on the device;

executing task activities comprised by the generated local part ($W_n$) on the device;

performing a request to a discovery service in order to obtain one or several identifications of next devices; and sending one or more messages representing a routing activity ($r_{ij}$) to the one or more next devices thus identified.

16 Claims, 9 Drawing Sheets

800

OTHER PUBLICATIONS

Agarwal, Vikas , "A service creation environment based on end to end composition of Web services", *Proceedings of the 14th international conference on World Wide Web*, (2005), 128-137.

Karastoyanova, D. , et al., "Extending BPEL for run time adaptability", *2005 Ninth IEEE International EDOC Enterprise Computing Conference*, (2005), 15-26.

Lakhal, Neila B., et al., "THROWS: An Architecture for Higly Available Distributed Execution of Web Services Compositions", *Proceedings of the 14th International Workshop on Reasearch Issues on Data Engineering: Web Services for E-Commerce and E-Government Applicaitons* (*RIDE '04*), (2004),8 pgs.

Mandell, Daniel J., et al., "Adapting BPEL4WS for the Semantic Web: The Bottom-UP Approach to Web Service Interoperation", *Dept. Computer Science, Knowledge Systems Laboratory*, Stanford University, 16 pgs.

Schulz, K., et al., "Architectural Issues for Cross-Organisational B2B Interactions", *2001 International Conference on Distributed Computing Systems Workshop, IEEE*, (2001), 79-87.

* cited by examiner

800

ENABLING PERVASIVE EXECUTION OF WORKFLOWS

CLAIM OF PRIORITY

The present patent application claims the priority benefit of the filing date of European Application (EPO) No. 05291996.6 filed Sep. 27, 2005, the entire content of which is incorporated herein by reference.

TECHNICAL FIELD

Example embodiments relate to the execution of workflows on a plurality of local devices such as in pervasive environments, semantic composition of web services and distributed execution of workflows. In particular, some embodiments relate to the distributed execution of workflows in pervasive environments, where the execution cannot rely on centralised control.

TECHNICAL BACKGROUND AND PRIOR ART

Pervasive computing is the trend towards increasingly ubiquitous, connected computing devices in the environment, a trend being particularly brought about by a convergence of advanced electronic—and particularly, wireless—technologies and the Internet.

The goal in pervasive computing is to create a system that is pervasively and unobtrusively embedded in the environment.

Pervasive environments feature complex computer applications that allow mobile users to access ambient services. The area of applicability of these services is very wide and may range e.g. from residential temperature control to customer assistance in a shopping centre as described e.g. in A. Ranganathan and S. McFaddin (Using workflows to coordinate web services in pervasive computing environments. In: Proceedings of the IEEE International Conference on Web Services 2004, pages 288-295, July 2004)

In most existing examples of pervasive services, the mobile end-users act only as clients of complex business processes at least partly executed by the ambient infrastructure.

In the state of the art (Web services tool kit for mobile devices, http://www.alphaworks.ibm.com/tech/wstkmd 2002; S. Berger, S. McFaddin, C. Narayanaswami, and M. Raghunath. Web services on mobile devices—implementation and experience. In Fifth IEEE Workshop on Mobile Computing Systems and Applications, 2003), a distributed computation paradigm has been suggested, where mobile users do not act merely as clients but can also actively participate in the execution of the overall services, providing their resources as it has become possible to run more and more complex applications on mobile devices.

Using such a distributed execution environment, complex interoperations between mobile devices can therefore be envisioned as an extension of the classical workflow concept.

The execution of a workflow by a set of devices in the pervasive environment raises new requirements such as the compliance of the overall sequence of operations with the pre-defined workflow execution plan.

Most of the research in the area of workflow execution in pervasive environments concerns the interaction between end-users and the process.

Particularly, A. Ranganathan and S. McFaddin (Using workflows to coordinate web services in pervasive computing environments. In: Proceedings of the IEEE International Conference on Web Services 2004, pages 288-295, July 2004) discuss a workflow-based architecture to help mobile users of unfamiliar pervasive environments. Moreover, D. Chakraborty and H. Lei (Pervasive enablement of business processes. In: Proceedings of the Second IEEE Annual Conference on Pervasive Computing and Communications 2004. PerCom 2004, pages 87-97, March 2004) discuss human interactions within BPEL processes, where an architecture adapting to workflow users' mobility is introduced. In these architectures end-users participate in workflow only with a low level of implication within the workflow execution managed by the ambient infrastructure.

Quite extensive work on semantic composition of web services basically falls in one of two approaches:

- assignment of web services instances at process design time (as described e.g. in V. Agarwal, K. Dasgupta, N. Karnik, A. Kumar, A. Kundu, S. Mittal, and B. Srivastava. A service creation environment based on end to end composition of web services. In Proceedings of the WWW conference, 2005) or
- assignment of web services instances at runtime (as described e.g. in D. J. Mandell and S. A. McIlraith. Adapting bpel4ws for the semantic web: The bottom-up approach to web service interoperation. In Proceedings of International Semantic Web Conference, October 2003).
- M. G. Nanda, S. Chandra, and V. Sarkar (Decentralizing composite web services. In: Proceedings of Workshop on Compilers for Parallel Computing, January 2003) discuss a decentralised orchestration scheme for web services, in which starting from a centralised BPEL process specification, a distributed one is produced and deployed on already designated web services.

According to B. Benatallah, M. Dumas, and Q. Z. Sheng. Facilitating the rapid development and scaleable orchestration of composite web services. Distributed and Parallel Databases, 17(1):5-37, 2005 a distributed orchestration platform is implemented for composite web services. Both of these solutions propose distributed composition of web services chosen at the process designing phase, so that they suffer from a static design and far from meeting the requirements of pervasive environments.

SUMMARY

In example embodiments, a method and an architecture is proposed supporting distributed execution of workflows in pervasive environments particularly based on a fully decentralised control and dynamic assignment of roles to devices within the pervasive environment. Accordingly, example embodiment may allow coping with the lack of dedicated management infrastructure within a pervasive environment through distributed mechanisms, especially when the pervasive environment lacks a dedicated infrastructure to perform workflow management tasks.

An example of a method for executing a workflow on a device such as a device within a pervasive computing environment, the workflow comprising one or more task activities comprising actions performed by devices participating in the workflow and routing activities used to transfer control and data between devices, may comprise the operations of:

- receiving a message representing an incoming routing activity;
- generating from the workflow a local part to be executed on the local device;
- executing task activities comprised by the generated local part on the local device;

performing a request to a discovery service in order to obtain one or several identifications of next local devices; and sending one or more messages representing a routing activity to the one or more next local devices thus identified.

Another example of a method for executing a workflow may further comprise the operation of retrieving from the message a number of a local part of a workflow to be executed on the local device.

In another example of a method for executing a workflow the message may include data and the method may further comprise the operation of updating the data.

In another example of a method for executing a workflow the message may comprise a mapping table and the method may further comprise the operation of updating the map.\

In another example of a method for executing a workflow, the generation of the local part from the workflow may further comprise the following operations:

modifying partner links in the workflow in order to specify coherent partner links;

deleting at least part or all task activities in the workflow that do not belong to the local part, while keeping the dependencies specified by process control activities;

simplifying redundant routing activities in the workflow;

simplifying process control activities in the workflow.

Another example of a method for executing a workflow may further comprise the operation of translating the generated local part into standard BPEL (Business process execution language for web services, refer e.g. to http://www.ibm.com/developerworks/library/ws-bpel/).

In another example of a method for executing a workflow, the workflow may further comprise roles and the performing of a request to a discovery service may comprise matching a role to the device capabilities.

In another example of a method for executing a workflow, the capabilities of a device are specified using the OWL-S standard (refer to Owl-s specifications, http://www.daml.org/services, 2003, particularly version 1.1).

In another example of a method for executing a workflow, the message representing the incoming routing activity may comprise at least part of the following:

a workflow;

a unique instance identifier;

a number of a local part of a workflow to be executed by the workflow engine having received the message representing the incoming routing activity.

In another example of a method for executing a workflow, the message representing the incoming routing activity may further comprise a mapping table between roles and devices.

In another example of a method for executing a workflow, the message representing the incoming routing activity may further comprise data comprising control data, relevant data and/or application data.

In another example of a method for executing a workflow, a mapping table may be complete at the workflow initialisation phase.

In another example of a method for executing a workflow, a mapping table may be updated at each workflow vertex.

In another example of a method for executing a workflow, the identification may comprise a unique instance identifier which may comprise a random number plus an IP address of a workflow initiator.

In another example of a method for executing a workflow, a discovery of all local devices may be enabled at the workflow initialisation phase.

In another example of a method for executing a workflow, a discovery of local devices may be enabled along with a workflow instance.

In another example of a further method for executing a workflow, the discovery is based on OWL-S.

An example of a workflow engine for executing a workflow on a device, the workflow comprising one or more task activities comprising actions performed by devices participating in the workflow, routing activities used to transfer control and data between devices, the workflow engine comprising:

a receiving component configured to receive a message representing an incoming routing activity;

a generating component configured to generate from the workflow a local part to be executed on the device;

an executing component configured to execute task activities comprised by the generated local part on the device;

a performing component configured to perform a request to a discovery service in order to obtain one or several identifications of next devices; and a sending component configured to sending one or more messages representing a routing activity to the one or more next devices thus identified.

An example of a workflow engine for executing a workflow on a device, such as a local device within a pervasive computing environment, the workflow comprising one or more task activities comprising actions performed by devices participating in the workflow, routing activities used to transfer control and data between devices, the workflow engine may comprise:

means or coding portion for receiving a message representing an incoming routing activity;

means or coding portion for generating from the workflow a local part to be executed on the local device;

means or coding portion for executing task activities comprised by the generated local part on the local device;

means or coding portion for performing a request to a discovery service in order to obtain one or several identifications of next local devices; and means or coding portion for sending one or more messages representing a routing activity to the one or more next local devices thus identified.

In a further example of a workflow engine, the executing component or the means or coding portion for executing task activities comprised by the generated local part may execute an internal process and an external process and the internal process may communicate with device applications.

In a further example of a workflow engine, the executing component or the means or coding portion for executing the required task activities may be BPFL enabled.

Another example of a workflow engine may further comprise mans or coding portion for retrieving from the message a number of a local part of a workflow to be executed on the local device.

In another example of a workflow engine the message may include data and the method may further comprise the operation of updating the data.

In another example of a workflow engine the message may comprise a mapping table and the method may further comprise the operation of updating the map.

In another example of a workflow engine, the means or coding portion for generating of the local part from the workflow may further comprise:

means or coding portion for modifying partner links in the workflow in order to specify coherent partner links;

means or coding portion for deleting at least part or all task activities in the workflow that do not belong to the local part, while keeping the dependencies specified by process control activities;

means or coding portion for simplifying redundant routing activities in the workflow;

means or coding portion for simplifying process control activities in the workflow.

Another example of a workflow engine may further comprise means or coding portion for translating the generated local part into standard BPEL (Business process execution language for web services, refer e.g. to http://www.ibm.com/developerworks/library/ws-bpel/).

In another example of a workflow engine, the workflow may further comprise roles and the means or coding portion for performing of a request to a discovery service may comprise means or coding portion for matching a role to the device capabilities.

In another example of a workflow engine, the capabilities of a device are specified using the OWL-S standard (refer to Owl-s specifications, http://www.daml.org/services, 2003, particularly version 1.1).

In another example of a workflow engine, the message representing the incoming routing activity may comprise at least part of the following:

a workflow;

a unique instance identifier;

a number of a local part of a workflow to be executed by the workflow engine having received the message representing the incoming routing activity.

In another example of a workflow engine, the message representing the incoming routing activity may further comprise a mapping table between roles and devices.

In another example of a workflow engine, the message representing the incoming routing activity may further comprise data comprising control data, relevant data and/or application data.

In another example of a workflow engine, a mapping table may be complete at the workflow initialisation phase.

In another example of a workflow engine, a mapping table may be updated at each workflow vertex.

In another example of a workflow engine, the identification may comprise a unique instance identifier which may comprise a random number plus an IP address of a workflow initiator.

In another example of a workflow engine, a discovery of all local devices may be enabled at the workflow initialisation phase.

In another example of a workflow engine, a discovery of local devices may be enabled along with a workflow instance.

In another example of a workflow engine, the discovery is based on OWL-S.

An example of a protocol for the distributed execution of a workflow on a multitude of devices, particularly for use with the above method and/or workflow engine, such as devices of a pervasive computing environment, the protocol comprising the exchange or sending of messages within the multitude of devices, the messages may comprise at least part of the following:

a workflow definition;

a unique instance identifier; and a workflow vertex number that has to be executed by the workflow engine having received the message.

The proposed architecture, method and protocol allow the execution of completely distributed business processes where business partners can be discovered at runtime.

Thanks to the fully decentralised control that is the underpinnings of the execution model, this architecture will foster the development of new business cases suited to pervasive environments.

The proposed architecture and method particularly is self managing, enabling a completely distributed workflow execution. The architecture and method allows running more complex pervasive collaborations between mobile workers or devices.

The architecture seeks to address the runtime approach and to add to existing solutions a stateless distributed environment which allows more flexibility for the execution.

It further introduces an extension of BPEL language interpreting distributed processes to allow a runtime discovery of involved web services.

SHORT DESCRIPTION OF THE FIGURES

Further objects, features and advantages will become apparent when studying the following detailed description, in connection with the annexed figures. It should be understood that even though examples are separately described, single features thereof may be combined to additional examples.

DETAILED DESCRIPTION

Figure 1:
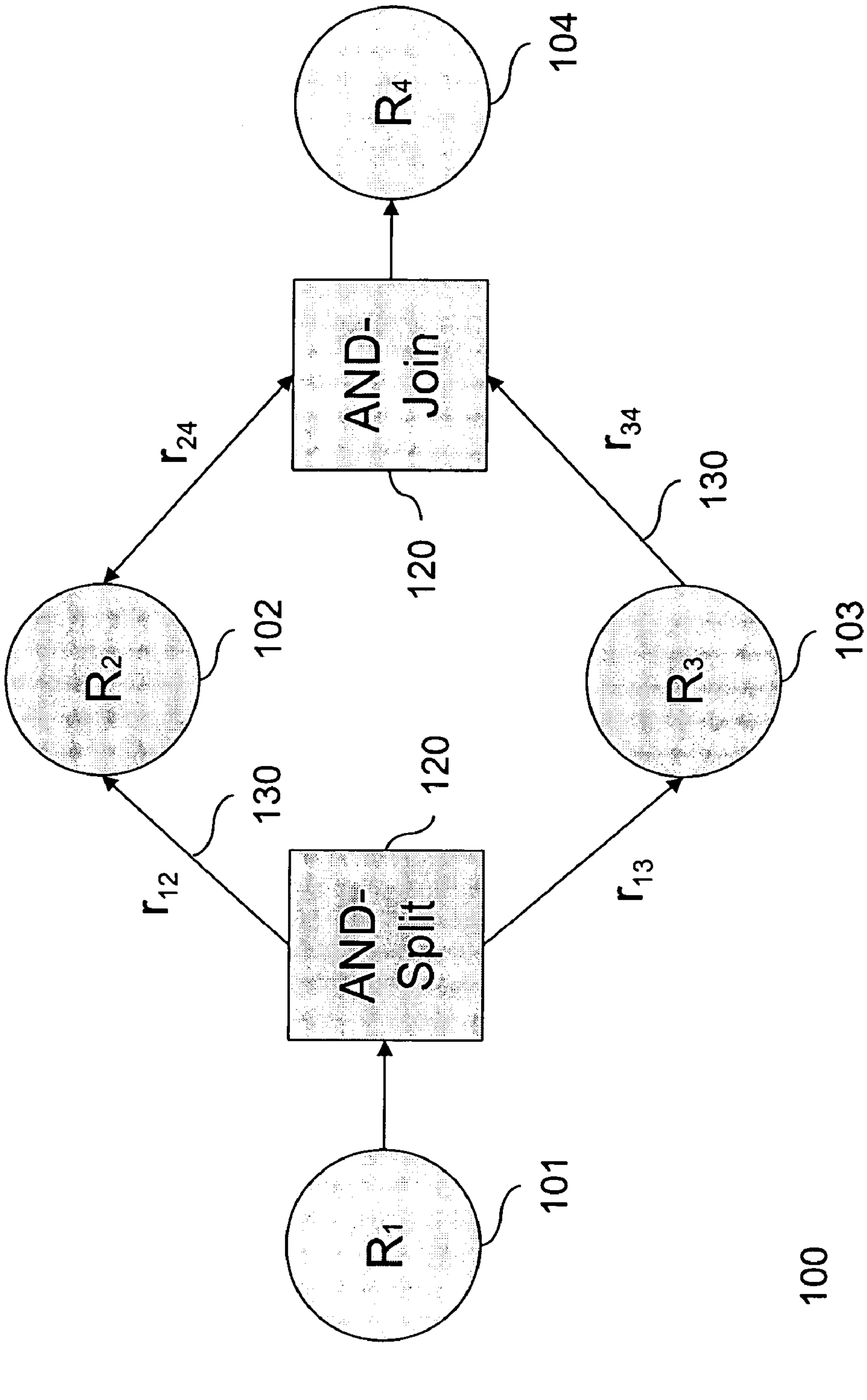
FIG. 1 shows a schematic representation of an exemplified workflow with two branches.

FIG. 1 shows a schematic representation of an exemplified workflow with two branches. In this figure, functionally equivalent elements are designated with like reference signs.

In general, the pervasive nature of the execution environment is characterised by two basic assumptions:

distributed control: no single device is in charge of managing the workflow execution and the overall control is assured through the collaboration of the devices involved in the execution of the workflow.

dynamic task assignment: the devices that will be executing an instance of a given workflow are not known in advance.

Particularly, the second assumption implies a service to assure discovery of devices executing a workflow instance. The present application focuses on the workflow execution support, the main features of this service discovery are therefore detailed. Particularly, two cases are envisaged: source discovery enabling discovery of all devices at workflow initialisation phase and runtime discovery enabling devices' discovery along with a workflow instance.

A pervasive workflow W, i.e. a workflow in the classical sense, distinguished by the fact that its execution is distributed among several, physically separate devices (such as smart tags, mobile devices (e.g. cellular phones or PDAs) and stationary devices) communicating with each other, may be represented using a directed graph 100. In the graphical workflow model, each circle-shaped vertex 101, 102, 103, 104 represents at least part or all workflow actions contiguously performed by a device, whereas the edges 130 represent the sequence of workflow operations among devices.

The following activities associated with a graph definition are distinguished:

$t_{in}$: task activities comprising or consisting of actions performed by devices participating in the workflow. Each task activity may be locally executed by a given device and a vertex 101 represents a set of task activities which may be locally executed on the same device. As a result, each vertex 101-104 may be linked to a single device and two neighbour vertices in the graph may be linked to two different devices. Each task activity is identified by an index i and the index n of the vertex where it is executed.

$r_{ij}$: routing activities used to transfer control and data between devices. These are the graph edges 130 and represent the data exchanged between the devices linked to two consecutive vertices during the execution of a workflow instance. i and j are the indexes of the vertices linked by this edge.

f: process control activities describing execution schemes and specific dependencies between routing and task activities.

In the graphical workflow model, each box-shaped vertex 120 represents an execution scheme and a specific dependencies between routing and task activities. At least one of three types of dependencies may be considered (cf. also The workflow reference model, Technical Report WFMCTC-1003, Workflow Management Coalition, 1995):

Sequential execution: abstract interpretation of the directed graph,

AND-Split/AND-JOIN: branches of routing and task activities executed in parallel, OR-Split/OR-JOIN: branches based on conditional choice.

The workflow W may therefore be a finite set of task activities $t_{in}$, routing activities $r_{ij}$ and/or process control activities f. In the example shown in FIG. 1, the device executing the task activities of vertex 101 sends data to the devices in charge of vertices 102 and 103 ($r_{12}$ and $r_{13}$). Vertices 102 and 103 are executed in parallel and the device executing vertex 104 gathers the results.

In the present description, for the sake of easier comprehension only simple workflow scenarios may be considered where no synchronisation issues are dealt with, branches are executed in parallel without any constraints. Fault handling or compensation mechanisms may also not be considered. However, it should be understood that example embodiments may also include aspects relating to synchronisation and/or parallel execution of branches (at least partly) with constraints and/or fault handling or compensation mechanisms.

In addition, the notion of a role derived from usual workflows may be considered. A role $R_i$ may be defined as a set of attributes necessary to execute the task activities $t_{in}$ associated to a vertex i. As stated before, in the following it is assumed that the execution of a workflow instance is at least partly not a priori assigned to any devices and/or users, but they are at least partly discovered at runtime.

The workflow model therefore relies on the notion of role defining an abstract entity whereas usual known workflows rely on the notion of business partners which are identified persons or organisations. In a first approach, each role may be considered as consisting of at least two types of attributes:

Security credentials assuring the right to execute (user perspective) on the one hand, and/or Proof of compliance with the workflow task activities assuring the capability to execute the required tasks (device perspective) on the other hand.

Figure 2:
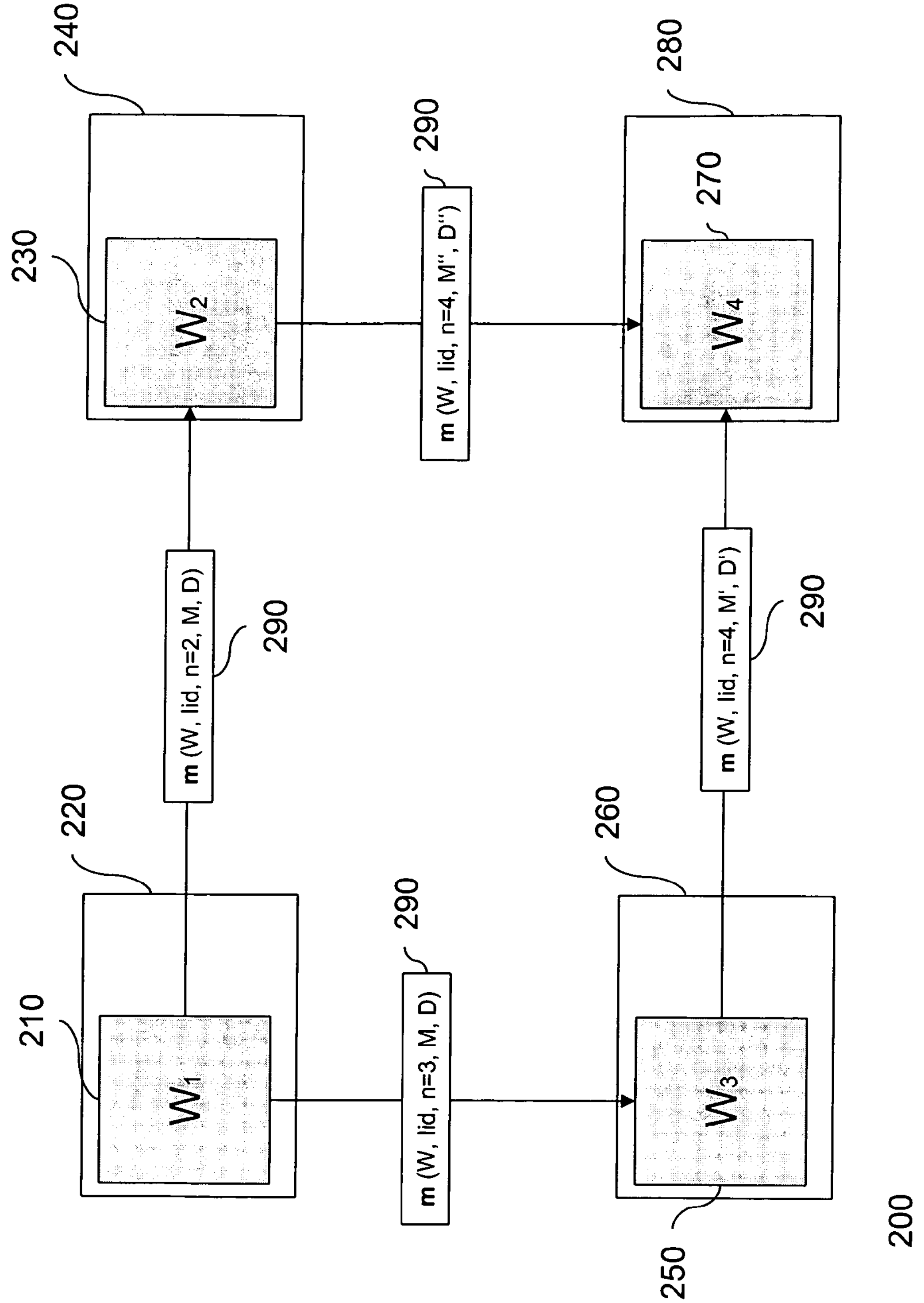
FIG. 2 shows a schematic representation of an example distributed system of devices executing the workflow shown in FIG. 1 in a distributed manner.

FIG. 2 shows a schematic representation of an example distributed system 200 of devices executing the pervasive workflow shown in FIG. 1 in a distributed manner.

A distributed system 200 on which a pervasive workflow 100 may be executed in a distributed manner comprises devices 220, 240, 260, 280 which are interconnected in order to allow communication, i.e. the sending of messages between them. In other words, considering a distributed setting which does not rely on any dedicated workflow management system implies that the workflow management task is distributed among part or all involved devices 220 (240, 260, 280). As a result, a part of the workflow management infrastructure may also be deployed on each device. Therefore, each one of the devices 220, 240, 260, 280 comprises a workflow engine 210, 230, 250 and 270 executing on the device. In other words, a workflow engine 210 (230, 250, 270) may be implemented on each device at least partly participating to the workflow. A workflow engine typically is software in charge of interpreting the representation of a workflow using a computational form also called workflow description language. Each workflow engine may be in charge of managing locally on the devices the execution of the workflow.

With respect to the representation in FIG. 2 it basically may comprise the following sequence of tasks:

Reception of part or all incoming routing activities ($r_{in}$),

Execute on the device the required task activities corresponding to the current vertex, and/or Send a routing activity to the next device(s).

Due to availability issues introduced by the pervasive environment, a stateless model may be particularly chosen. A single vertex may only be linked with a device at a time, meaning that after the execution of a given vertex, substantially no residual information may be stored on a device, but they may be all transferred to the next one. As described, the notion of pervasive workflow W may describe the complete workflow execution pattern. At the workflow engine level, the local part $W_n$ of W locally executed on each device for each vertex n may be specified and the local part $W_n$ for a given vertex n may therefore comprise:

The task activities $t_{in}$ associated to the vertex n,

The routing activities $r_{in}$ arriving and $r_{nj}$ leaving the vertex n, and/or The set of process control activities f describing the dependencies between the considered $t_{in}$, $r_{in}$ and $r_{nj}$.

The complete execution of the workflow W may therefore be composed of the execution of the different local parts $W_n$ by the devices' local workflow engines.

Next, example messaging protocols used in the communications between the different workflow engines to allow a coherent execution of the local parts $W_n$ with respect to the complete workflow description W are described with further reference to FIG. 2.

The workflow engines 210, 230, 250, 270 send messages 290 representing the routing activities $r_{ij}$ to the devices that are to execute the next local parts of the workflow W. In other words, the sending of messages 290 between the engines refers to the routing activities described above. Each routing activity may at least partly specify the information required to enable a coherent workflow execution.

The main purpose of the sending of messages 290 within the architecture may be first to allow a device which does not have any a priori knowledge about a running instance of a workflow W to be part of it and execute what it is requested to at a given vertex. This device should then be able to forward operation requests to one or more appropriate recipients which particularly are next in the workflow execution. The architectural objectives of the information carried by a single message may therefore be as follows:

1. Identify the vertex n of the workflow instance executed to be able to determine the current operation of the execution;
2. Retrieve the $W_n$ associated to the considered vertex n to actually know what to execute;
3. Uniquely identify the workflow instance associated to the message received (for convergence point of branches);
4. Retrieve the identity of the devices associated to a role $R_i$ to keep track of devices involved in the workflow W; and/or
5. Retrieve the workflow data D to modify the state of the workflow W at each execution operation.

As a result, the following parameters in the message format may advantageously be considered for the routing activities:

W: complete workflow definition, which may be a representation of the above described directed graph;

Iid: Instance identifier, unique id to represent a given instance of a workflow. The Id may comprise a random number plus the workflow initiator identity (IP address);

n, that is the workflow vertex number that the message recipient has to execute;

Map M, a mapping table between roles and devices. This table may be updated with respect to the discovery mode used; it can either be complete at the workflow initialisation phase with source discovery or at least partly updated at each workflow vertex with runtime discovery; and/or Data D: may include up to three data types or more: control data, relevant data and/or application data.

Using such a messaging format allows a device upon reception of a request to cope with the following objectives:

n is included in the message, $W_n$ is derived from W with the knowledge of n,

The workflow instance is uniquely identified by Iid,

The association of roles $R_i$ to devices is stored in Map, and/or

Workflow data D are transported.

Figure 3:
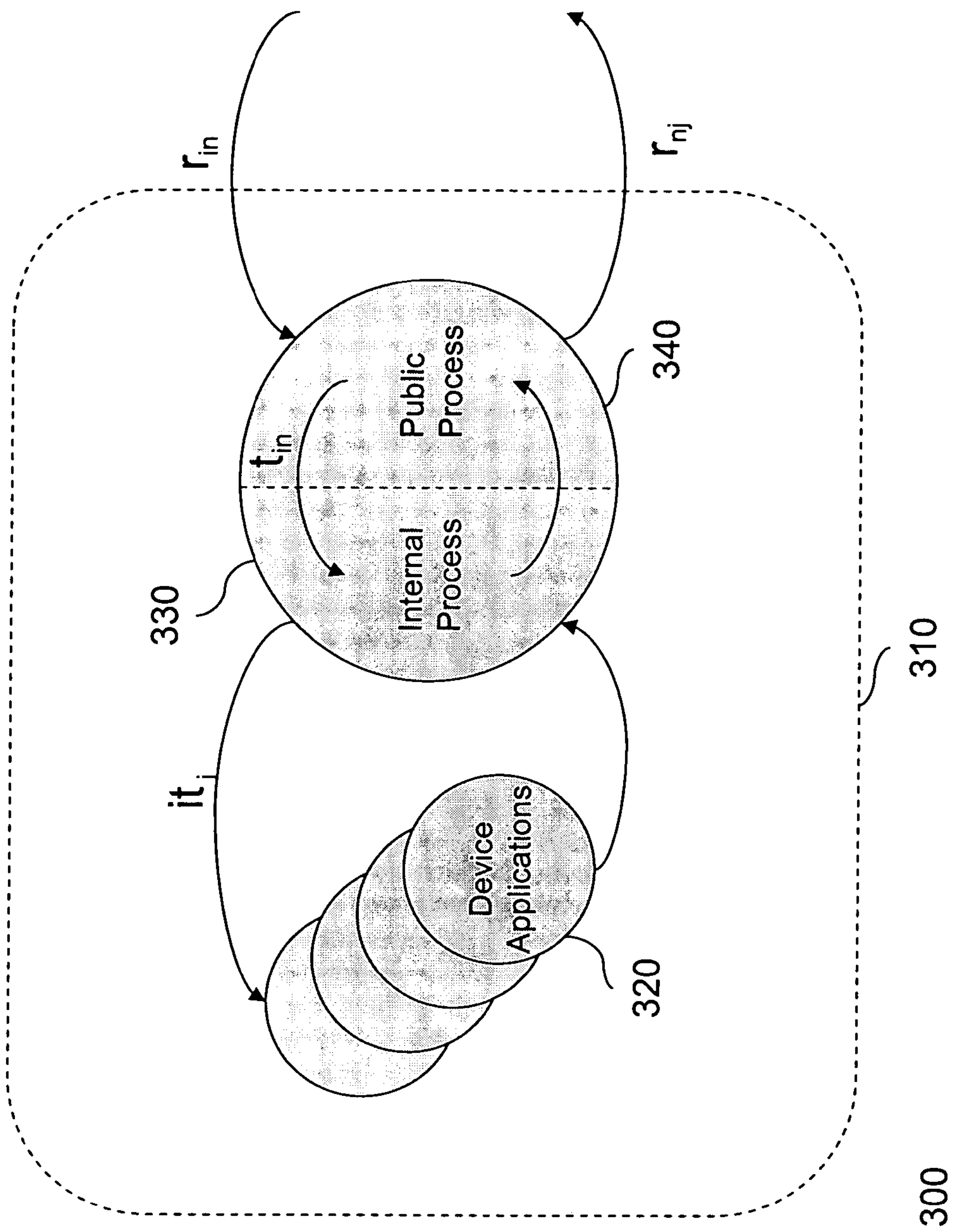
FIG. 3 shows an example of a schematic mobile device representation.

FIG. 3 shows an example of a schematic representation 300 of a mobile device 310.

The mobile devices 310 involved in a workflow instance may be an extension of the organisation they belong to. They may provide their contribution with respect to their available mobile applications or device applications 320 and/or may be in charge of managing their participation to the workflow execution.

Each device therefore comprises two parts: a set of mobile applications supported by the device and a (particularly embedded) workflow engine. The mobile applications 320 of each device 310 may be kept private, so that they can only be invoked by the device 310 itself. The workflow engine may act like a proxy, mediating between these applications 320 and the other devices of the collaboration or pervasive architecture.

Device Representation

Next, it is described how the access to the above mobile applications 320 through the workflow engine may be particularly performed.

To cope with the requirements introduced by cross organisational collaboration workflows, one may particularly adopt the representation of "private-public" processes disclosed in K. A. Schulz and M. E. Orlowska. Architectural issues for cross-organisational b2b interactions. In 21 st International Conference on Distributed Computing Systems Workshops (ICDCSW '01), pages 79-87, 2001.10. Accordingly, the embedded workflow engine may acquire mainly two roles:

managing the device internal applications 320 and co-ordinating the execution of the local part $W_n$ Of the workflow W.

Thus, two processes corresponding to these roles may be defined within each device:

The public process 340 may be the subset $W_n$ described above. This process definition includes the activities the device 310 is asked to perform during a workflow instance.

The private process 330 may be an internal one e.g. developed by the device user himself with respect to his device's embedded applications. The internal process 330 of device k is noted IPk. This process may not be considered to be distributed but coordinated in a centralised manner.

Accordingly, a hierarchical model with two levels to represent the task activities the devices 310 will have to perform in the workflow model is considered. The first level may correspond to the public definition of the workflow provided by the global process definition W and the subsets $W_n$ derived from it. At this first level, these task activities are called $t_{in}$ and their specifications are known by part or all involved devices (such as 310). These public task activities may be themselves processes involving different operations to be completed. The atomic definitions of these public $t_{in}$ may be specified within the private or internal processes 330 implemented on each device 310, which would constitute the second level. Accordingly, the atomic definition of a given task activity particularly is only known by the device in charge of executing this specific task. The link between these two levels may be realised through communications between public and/or private processes.

Private, Public Processes Link Specification

To represent the internal process of a given device 310, the same notation as the one previously used is adopted. The internal process IPk of device k may be as a result a set of internal activities:

Internal task activities $i_{ti}$ specifying the atomic tasks performed by the device, and/or Process control activities f specifying the execution schemes of the internal task activities.

This process may be centralised, while routing activities may not be defined. Using this notation, one may define a public task activity $t_{in}$ as a subset $T_i$ of the internal process IPk composed of the internal task activities $i_{ti}$ and the process control activities f. The internal process IPk of a device k may be therefore divided into different subsets $T_i$ substantially corresponding to the public task activities $t_{in}$ defined in $W_n$.

Figure 4:
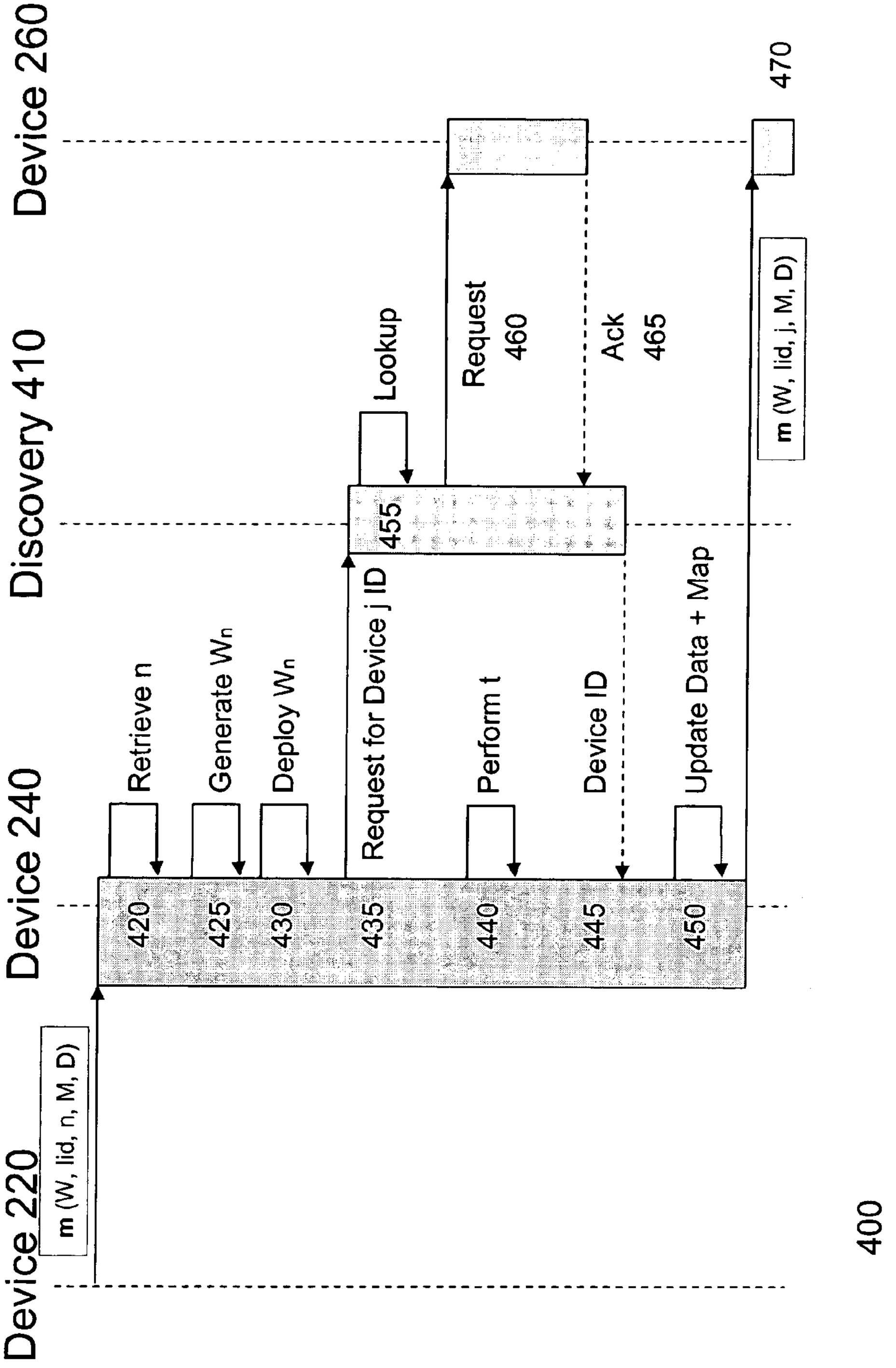
FIG. 4 shows an example of a schematic architecture sequence diagram.

The internal communications resulting from this description are depicted in FIG. 4. Whenever the (particularly local or mobile) device 220 needs to perform a task activity tin after having received a routing activity $r_{in}$, the public process may forward the request to the internal process which executes the subset Ti corresponding to $t_{in}$. The local applications required to achieve that subset are thus invoked. The result may be transferred to at least part of the other devices via the public process by the routing activity $r_{nj}$.

So far the behavioural characteristics of the elements part of the presented pervasive workflow architecture were described. Next, how these elements work together and the basic mechanisms of this architecture are described in more detail.

FIG. 4 presents an example sequence diagram depicting the interactions between three devices 220, 240 and 260 in charge of executing three vertices i, n and j and the ambient role discovery service 410. A runtime discovery scenario is particularly assumed. Upon reception of routing activity $r_{in}$, device n first retrieves n and generates the $W_n$ associated to the vertex n it has to execute.

In other words, upon reception of a message 290 of the form m (W, lid, n, M, D) from device 220, device 240 retrieves the number n of the vertex n to be executed in operation 420. Using this information, the local part $W_n$ of the workflow W contained in the message 290 is generated in operation 425. In operation 430, the generated local part Wn is deployed on the workflow engine 230 executing on the device 240.

In the meantime, the device 240 may perform a request to the role discovery service in operation 435 in order to get the Id of the device that will execute the next vertex j of the workflow W. The request is sent to the ambient discovery service 410 which performs a lookup of available devices in operation 455. Having found a potential device 270 for executing the next vertex j of the workflow W, the discovery service 410 sends a request to the potential device 270 and waits for an acknowledgement message, which the potential device 270 sends back to the discovery service 410 in operation 465. Having received the acknowledgement message from the potential device 270 in operation 465, the discovery service 410 sends back the device ID 270 to the device 240 in operation 445.

Once the local part $W_n$ is completed and device j's Id is received, the Data D and/or Map M fields are updated in operation 450, the next message 290 representing the next routing activity $r_{nj}$ is sent to the identified device 270 in operation 470. Particularly, this notion of role may be associated with the discovery service described above. The role discovery service may be in charge of assigning devices/users owning the proper role for the execution of task activities at a given vertex. In other words, when looking up potential devices for executing the next vertex j of the workflow W, then the discovery service 410 will match a role $R_j$ associated with a particular vertex j with the capabilities of each device 220, 240, 260 considered as the next potential device for executing the next vertex j of the workflow W.

Next, an application using Web services technology is described, whose composition properties are appropriate for distributed workflow applications. Web services technology may make use of BPEL (Business process execution language for web services, refer e.g. to http://www.ibm.com/developerworks/library/ws-bpel/), workflow description language and/or WSDL (refer e.g. to E. Christensen, F. Curbera, G. Meredith, and S. Weerawarana. Web services description language (wsdl) 1.1, http://www.w3.org/TR/wsdl 2001) standard to enable the composition of services within workflows.

Basis of BPEL (Business Process Execution Language For Web Services)

Figure 5:
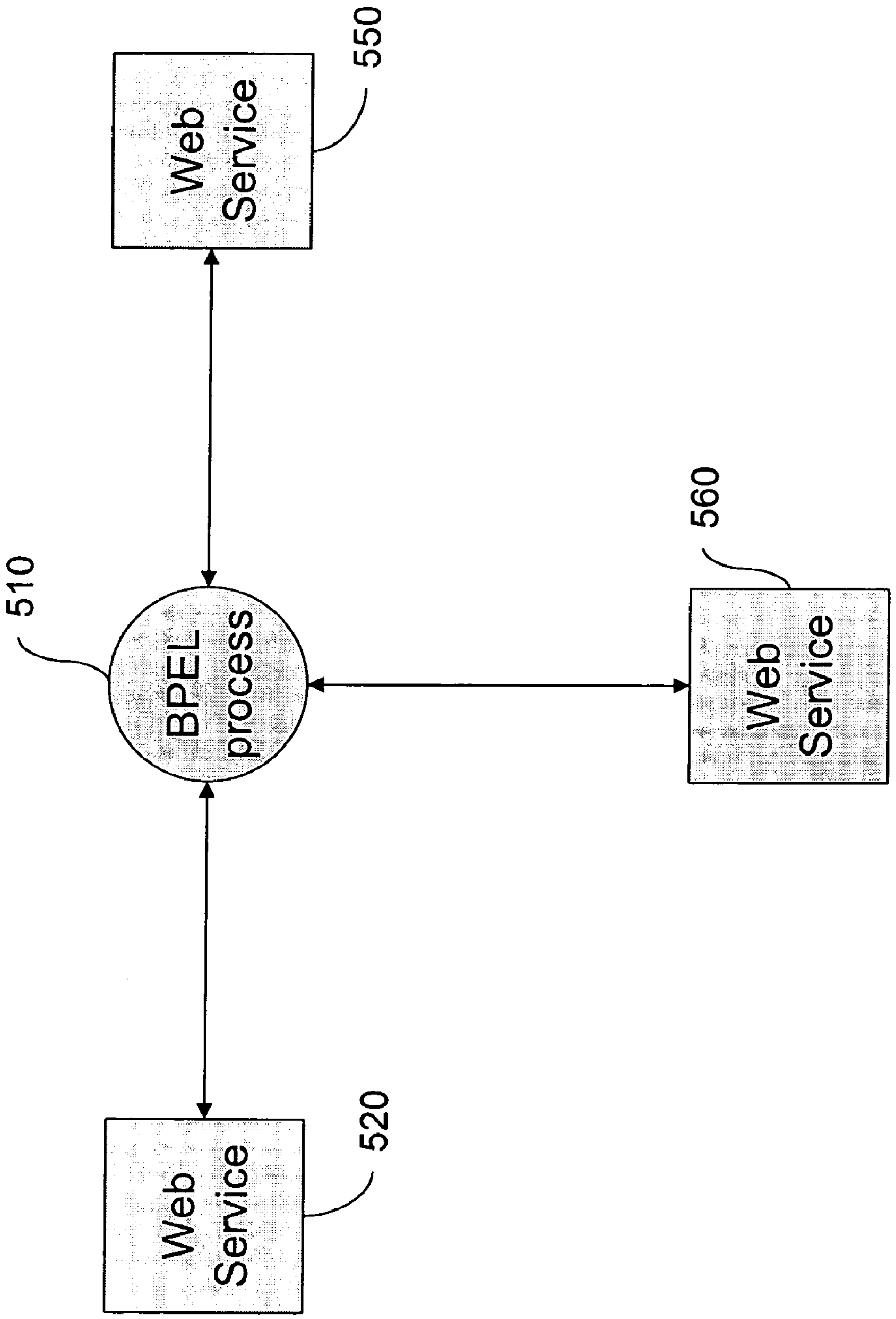
FIG. 5 shows exemplified entities involved in a BPEL process.

FIG. 5 depicts two example types of entities that BPEL processes 510 mainly involve: the central BPEL process 510 and the web services 520, 550, 560 part of its execution. The BPEL process 510 may be locally executed on a BPEL engine which may be itself a web service. BPEL processes 510 may therefore be strongly linked to WSDL standard used to describe web services functionalities and how to communicate with them.

Role of WSDL (Web Services Description Language)

In this perspective, an example role of WSDL is described before giving details on BPEL. In particular, WSDL may be used to describe how to communicate with a given web service. Basically it includes the definition of available operations, variable formats, service URI (Uniform Resource Identifier) and messaging formats. In the context of BPEL, the following WSDL parameters may be used:

operation,
portType and
partnerLinkType.

A WSDL portType defines a set of operations that can be invoked on the service. The partnerlinkType parameter is used to describe in case of BPEL processes a communication channel between two web services. It associates a portType of each service to form a channel composed of two unidirectional links. Within it, each service may be assigned to a unique role and can send information to the other using the latter's specified portType. BPEL processes may be built on top of the WSDL definitions of all involved web services.

BPEL Processes

BPEL is an XML-based workflow description language for coordinating Web Services mainly in a centralized perspective. As depicted in FIG. 5, web services parts 520, 550, 560 of a BPEL workflow typically only have interactions with the BPEL engine in charge of managing and interpreting the whole process execution. The interactions within the process may be described in terms of partnerLink which associates one or more (e.g. two) web services in a WSDL partnerlinkType by assigning the partnerlinkType roles to them. BPEL language may use a set of activities to represent the workflow among which is at least one of the following: <Invoke> (web service invocation), <Receive> (waiting state), <Sequence> (sequential execution), <Flow> (concurrent execution), <Switch> (conditional scheme), <While> (iterative process) and/or <Pick> (conditional scheme based on external events).

Figure 6:
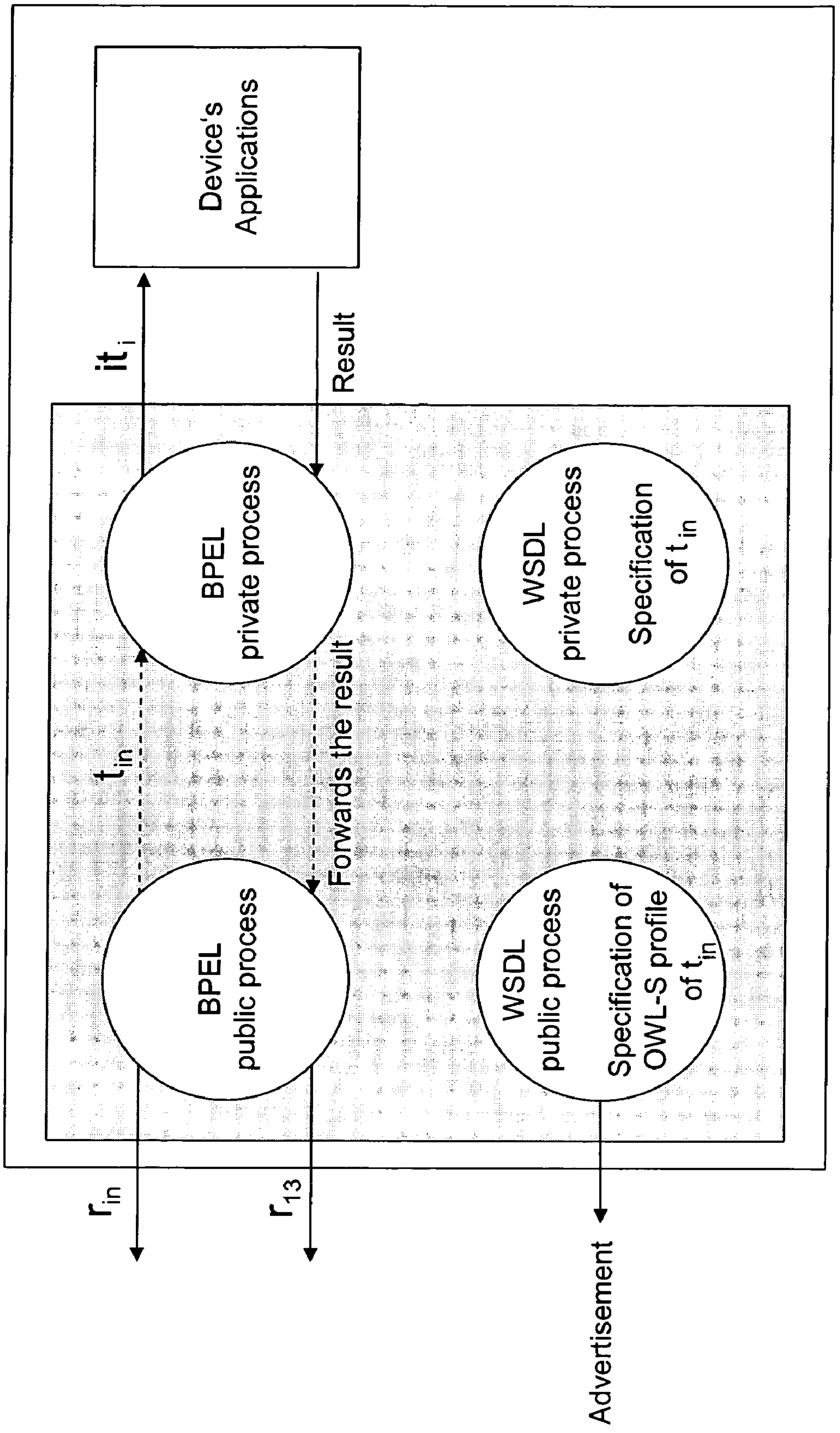
FIG. 6 shows an example of a web-services based device infrastructure.

FIG. 6 shows an example of a web-services based device infrastructure. In connection with the architecture definition the requirements on the workflow management system were analysed to enable the execution of the present pervasive workflow model, so that on each device corresponding workflow engines were particularly deployed. In the case of web services, these workflow engines may be BPEL enabled and communicate via a web service interface. Each device executing a vertex of a workflow instance should support this infrastructure. FIG. 6 identifies example details of the infrastructure components present on devices taking part in a pervasive workflow instance execution.

Two BPEL processes may be deployed on the BPEL engine, a BPEL public process $W_n$ and an internal one IPk. Each BPEL process may have its own WSDL description.

The public process may be contacted via routing activities; the public process WSDL therefore may include the specifications of routing activities as WSDL operations. Yet routing activities may be the only one used to contact the public BPEL process, so that the device's functionalities (i.e. the task activities it is able to execute) may be advertised or announced so that it can be identified as a potential actor of a workflow instance during the discovery process. These functionalities may be particularly represented using the web service ontology OWL-S (refer to Owl-s specifications, http://www.daml.org/services 2003). This OWL-S specification may assist a role discovery service to perform the selection of the devices executing the workflow. Part of this selection process may be based on what is required by a workflow in terms of task activities, and what available devices advertise particularly in their OWL-S specification.

For the details of the OWL-S discovery system as examples of such semantic matching services reference is made to "Parametrized semantic matching for workflow composition, Technical Report RC23133, IBM, 2004 and to M. Laukkanen and H. Helin, Composing workflows of semantic web services, in: Workshop on Web Services and Agent-based Engineering, 2003, which are incorporated herein by reference. Integrating an ontological definition in the infrastructure may assume that each potential actor of a workflow shares a common ontology. The private process only receives requests from the public process via task activities. The specification as WSDL operations of these task activities may thus be part of the private process WSDL definition. By definition, the private process may be kept private and may be only available to his owner. What is here kept private may be the atomic definition of the task activities part of the public process, i.e. how they are locally executed by a device.

After having described the components part of the web services infrastructure, next the deployment of runtime mechanisms exposed in the present architecture is described. This includes first the computational representation of the global process definition W to enable a device to retrieve $W_n$ expressed in BPEL to execute a given vertex n. The specification of W may also enable the retrieval of valid WSDL specifications deployed with the $W_n$ BPEL process itself. Moreover, the link between public and private process using BPEL will be described.

Description of Distributed Workflow W

In the present infrastructure, the distributed workflow W is used by all involved devices to know what to execute. Pervasive workflows W may be represented using BPEL characteristics. Accordingly, an extension of both WSDL and BPEL associated to the pervasive workflow representation may be defined.

Process Representation

When intending to use BPEL activities to represent a distributed workflow W depicted by a directed graph. The $t_{in}$, $r_{ij}$ and f described above may be first translated into BPEL activities as follows:

$t_{in}$: These may be <invoke> activities invoking the BPEL private process of a device.

$r_{ij}$: These may be also <invoke> activities, the device executing vertex n invokes the device executing the next vertex with the required workflow data.

f: These may be <flow>, <sequence>, activities.

The concepts of BPEL processes may be used and they may be mapped to the directed graph approach above in order to define a workflow description language capable to (partly or completely) specify pervasive workflows W. This representation is called distBEPL standing for distributed BPEL. The goal of this extension particularly is to represent distributed processes from a global perspective whereas BPEL is currently limited to depict processes from a centralised perspective (as described above). BPEL control activities may be used to represent graph dependencies. For instance, <flow> construct may be used to represent AND-Split, AND-Join; <sequence> construct represents sequential execution. The workflow W shown in FIG. 1 may therefore be represented by the following XML representation, assuming that each vertex of this process implements one task activity.

```
<sequence>
    <t11>
    <flow>
        <sequence>
            <r12>
            <t21>
            <r24>
        </sequence>
        <sequence>
            <r13>
```

-continued

```
            <t31>
            <r34>
        </sequence>
    </flow>
</sequence>
```

The task activity of vertex 1 is first executed; a parallel execution of two sequence branches is then performed.

Defining WSDL Partner Link Types and OWL-S Profiles

Deploying a BPEL process may include the deployment of the WSDL definition of the web services involved in the process as well as the partnerLinkType definition. In the present architecture, execution of pervasive processes is to be particularly enabled whose participants are discovered at runtime. The WSDL specification of the involved web services will as a result only be known when the latter are identified. Yet, the service discovery procedure may include the verification of the capability of a device to actually execute all required task activities for a given vertex n. This capability matching procedure may use OWL-S ontology and more specifically the OWL-S service profile. Each vertex n is particularly associated to an OWL-S profile specifying the task activities of n. This complete description may be transported as part of the distBPEL representation of W. Moreover, a WSDL representation of the partnerLinkType may be included as part of W. Defining partnerLinkType supposes that portType are already specified. In the present case, the communications between devices may be done with the routing activities. As stated above, routing activities are simple invocations and the operation invoked on the device executing vertex j is called jreceive, the portType defining jreceive is called jportType. Each graph edge is associated to a partnerLinkType in a WSDL file part of W particularly with the form:

```
<pLT name="nj">
    <role name="ji">
        <pT="jportType"/>
    </role>
</pLT>
```

where n and j are the vertices number linked by the graph edge, i is the role number associated to vertex j. Each link may be mapped to a unidirectional channel since communications between two vertices are unidirectional. This link states that vertex n sends information on jportType of vertex j.

DistBPEL Representation

After having described the WSDL and OWL-S details part of W, distBPEL routing and task activities are described. The first parameters described are the partnerLink. In the present example there are particularly used unidirectional links in partnerLinkTypes, BPEL partnerLink may therefore be also unidirectional and a single role may be assigned. The following representation for partnerLink may be used:

<pL name="nj" pLT="nj" jRole="ji"/>

Enabling Pervasive Execution of Workflows

In the distBPEL partnerLink notation, the usual BPEL my/partnerRole parameter may be modified into a jRole. This transformation expresses the shifting between a centralised to a global point-of-view. Accordingly, one may specify the representation of routing and task activities in distBPEL. These two activities may be basic standard BPEL <invoke> activities. A routing activity rij may have the following form:

```
<invoke pL="nj" pT="jportType" operation="jreceive"/>
```

with the same notation as defined above. The complete specification of a task activity tin will be depicted later on since it may be internal to a device. The following representation is adopted in case of a signature operation for example:

<invokepL="ninternal" pT="nportType" operation="signature"/>

This mainly translates the idea of a task executed internally since the partnerLink and portType associated to the operation signature are not known by others.

Example of Process Representation in DistBPEL

Figure 7:
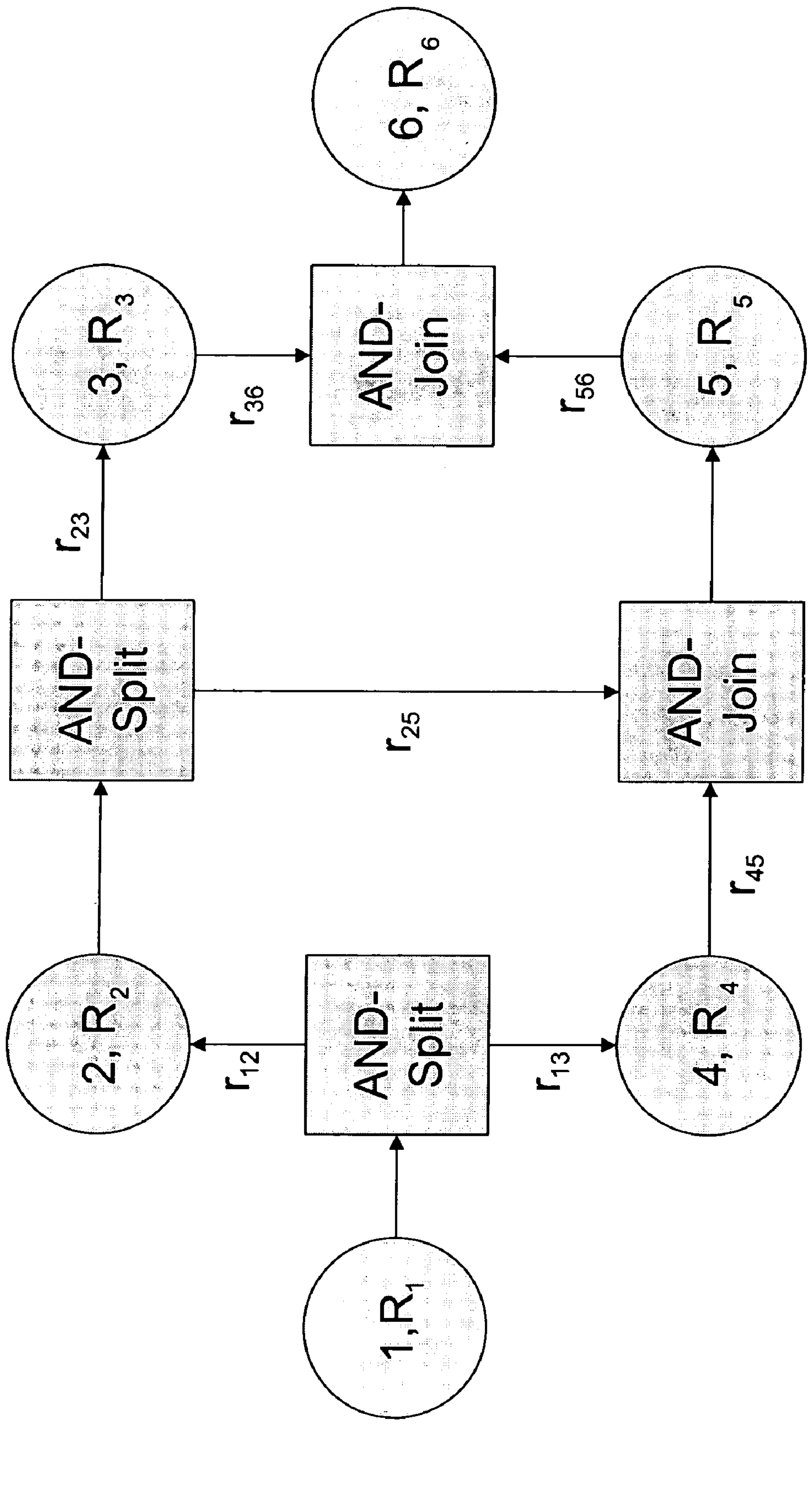
FIG. 7 shows an example of a complex business process.

A more complex example of a process representation is provided using distBPEL of FIG. 7. For the sake of simplicity, the following description will only focus on the abstract process definition. One may consider a process with parallel execution of two branches between activities and dependencies between the branches. The workflow exemplarily proposes two parallel branches of activities executed in sequence, the process control activities <sequence> and <flow> are thus used. This example is particular due to the routing activity r25 which links two vertices from different branches. To have a coherent and consistent process definition, this activity may be specified twice in the distBPEL process definition. The computational representation of the directed graph may indeed to take into account all dependencies between routing and task activities. In that specific case, r25 may be executed in parallel with r23 but may also be received by vertex 5 before executing t15. This activity appears as a result twice in the process representation.

```
<sequence>
  <invoke pL="1internal" pT="1portType" operation="11"/>
  <flow>
  <sequence>
        <invoke pL="12" pT="2portType" operation="2receive"/>
        <invoke pL="2internal" pT="2portType" operation="12"/>
        <flow>
        <invoke pL="23" pT="3portType" operation="3receive"/>
        <invoke pL="25" pT="5portType" operation="5receive"/>
        </flow>
        <invoke pL="3internal" pT="3portType" operation="13"/>
        <invoke pL="36" pT="6portType" operation="6receive"/>
  </sequence>
  <sequence>
        <invoke pL="14" pT="4portType" operation="4receive"/>
        <invoke pL="4internal" pT="4portType" operation="14"/>
        <flow>
        <invoke pL="45" pT="5portType" operation="5receive"/>
        <invoke pL="25" pT="5portType" operation="5receive"/>
        </flow>
        <invoke pL="5internal" pT="5portType" operation="15"/>
        <invoke pL="56" pT="6portType" operation="6receive"/>
  </sequence>
  </flow>
  <invoke pL="6internal" pT="6portType" operation="16"/>
</sequence>
```

Components of the Workflow W

According to the above, the specification of W in the present web services infrastructure may comprise at least one of the following:

- The representation of the workflow directed graph in distBPEL,
- The OWL-S specification the task activities executed for each workflow vertex n, and/or
- The WSDL specification of the partnerLinkType representing the $r_{ij}$.

Deriving the Local Part Wn

As stated, the execution of a vertex n described in W is linked to its local description $W_n$. Based on the representation of W using an extension of BPEL, distBPEL, an algorithm enabling the retrieval of $W_n$ associated to a vertex n with the only knowledge of n is described with reference to FIG. 8. The deployment of $W_n$ may include both WSDL and BPEL specifications. The WSDL definitions to be deployed may be the ones from the device's public and private processes, the WSDL representation of the next devices executing the next nodes and the WSDL specification of the partnerLinkTypes. The involved devices may provide their WSDL representations, so that only the BPEL definition of $W_n$ is described. The procedure may comprise up to five operations which will be described in more detail, considering the generation of local BPEL specification for vertex 5 in the workflow depicted in FIG. 7.

Figure 8:
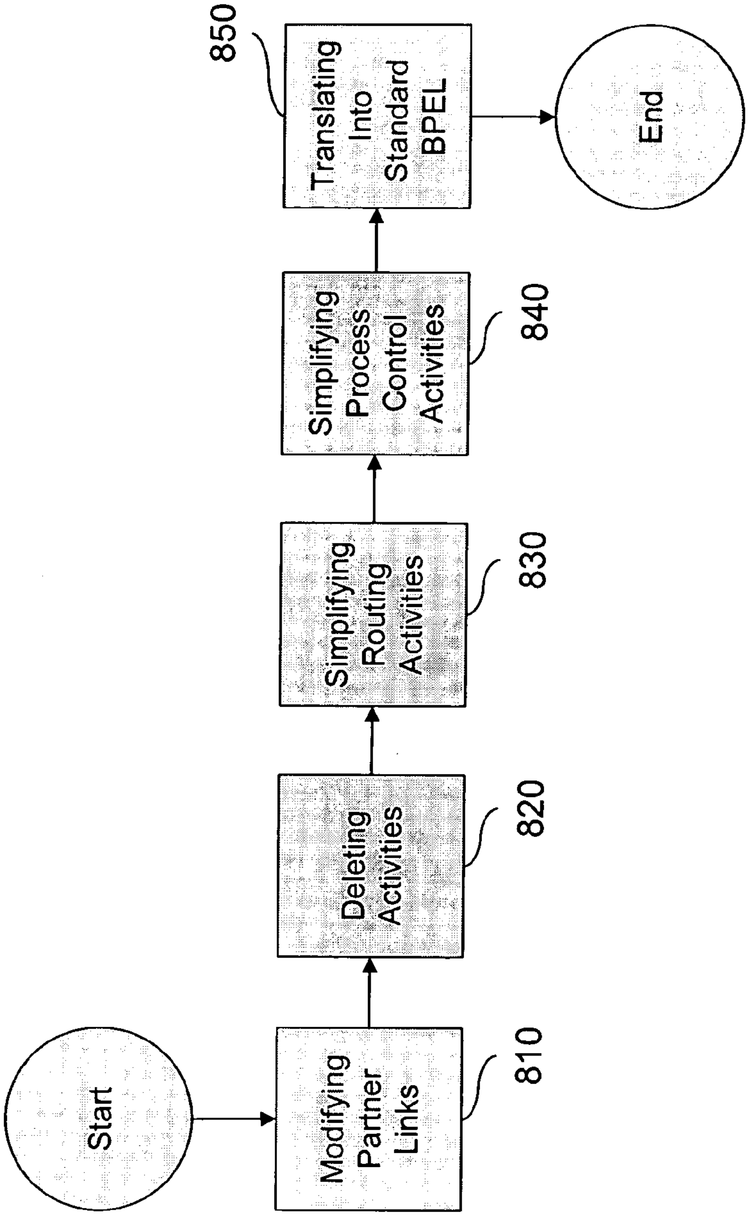
FIG. 8 shows an example of a method for deriving a local part of a distributed workflow.

In FIG. 8, operation 810 concerns the specification of coherent partnerLinks.

In distBPEL, one may specify the partnerLink section from a global point-of-view, when considering $W_n$, focusing on a vertex n. The distBPEL partnerLinks may be therefore modified accordingly. Here two cases may be considered: either the distBPEL partnerLink represents an incoming link in which case, the "nRole" becomes "myRole", or it represents an out coming link and the "nRole" becomes "partnerRole". For instance in the case of vertex 5 one gets (only partnerLinks involving vertex 5 are kept in the declaration):

```
<partnerLinks>
      <pL name="45" pLT="45" myRole="55"/>
      <pL name="25" pLT="25" myRole="55"/>
      <pL name="56" pLT="56" partnerRole="61"/>
</partnerLinks>
```

Operation 820 in FIG. 8 isolates the considered vertex.

The input of the algorithm shown in FIG. 8 is the global process description specified in connection with the example of process representation in distBPEL. From this input one may derive the local vision of vertex 5 and only consider the incoming and outcoming routing activities as well as the task activities performed at vertex 5. The first operation of the present procedure focuses on those specific activities and delete or disregard the activities in which vertex 5 is not involved. The other aspect is also to particularly keep the dependencies specified by the process control activities. According to the present procedure, r25, r45, t15, r56 are thus only conserved:

```
<sequence>
  <flow>
    <sequence>
        <flow>
        <invoke pL="25" pT="5portType" operation="5receive"/>
        </flow>
</sequence>
<sequence>
        <flow>
        <invoke pL="45" pT="5portType" operation="5receive"/>
        <invoke pL="25" pT="5portType" operation="5receive"/>
        </flow>
        <invoke pL="5internal" pT="5portType" operation="15"/>
        <invoke pL="56" pT="6portType" operation="6receive"/>
  </sequence>
  </flow>
</sequence>
```

Operation 830 in FIG. 8 concerns the simplification of redundant routing activities.

As stated in the description of distBPEL, all dependencies between activities may be specified in a distBPEL process description. As a result, in case of dependencies between concurrent branches, activities creating these dependencies may be specified twice. When focusing on a single vertex, one only keeps the instance of a redundant activity that creates dependencies on the activities concerning the vertex. In the example, the second instance of r25 introduces dependencies (sequential dependency) with the other activities of vertex 5. The first instance is thus erased or disregarded:

```
<sequence>
  <flow>
      <sequence>
          <flow> </flow>
      </sequence>
      <sequence>
          <flow>
          <invoke pL="45" pT="5portType" operation="5receive"/>
          <invoke pL="25" pT="5portType" operation="5receive"/>
          </flow>
          <invoke pL="5internal" pT="5portType" operation="15"/>
          <invoke pL="56" pT="6portType" operation="6receive"/>
      </sequence>
  </flow>
</sequence>
```

Operation 840 in FIG. 8 concerns the simplification of process control activities.

So far, the global process description was mainly restricted to the activities involving a given vertex. This created inconsistency with the process control activities. A process control activity indeed may specify an execution scheme between at least two routing or task activities. Process control activities which do not verify this property may be deleted from the specification. To do so, one may perform an iterative procedure until all process control activities properly specify an execution scheme of at least two activities:

```
<sequence>
<flow>
    <invoke pL="45" pT="5portType" operation="5receive"/>
    <invoke pL="25" pT="5portType" operation="5receive"/>
</flow>
    <invoke pL="5internal" pT="5portType" operation="15"/>
    <invoke pL="56" pT="6portType" operation="6receive"/>
</sequence>
```

Finally, operation 850 in FIG. 8 concerns the translation into standard BPEL.

The last operation may consist in retrieving a standard BPEL specification of the vertex local code. In distBPEL only <invoke> type activities were specified to model the process operations. In the code resulting of the third operation, only remain either incoming or out coming routing activities and the vertex task activities. The task activities may be left untouched since they are internal tasks and has to be specified by the device executing the vertex. The incoming routing activities may be modified. From the vertex point-of-view, these activities may correspond to a waiting state. This is expressed in BPEL by the activity <receive>. Incoming routing activities may be therefore transformed into <receive> activities with the same partnerLink, portType and operation. Outcoming routing activities may be on the contrary left untouched. Accordingly, the following BPEL code is obtained:

```
<sequence>
<flow>
<receive pL="45" pT="5portType" operation="5receive"/>
<receive pL="25" pT="5portType" operation="5receive">
</flow>
<invoke pL="5internal" pT="5portType" operation="15">
<invoke pL="56" pT="6portType" operation="6receive">
</sequence>
```

The BPEL specification obtained at operation 5 may be still regarded as an abstract representation. Prior to the final deployment on the BPEL engine, the specification for the different inputs and outputs of the operations invoked on the internal process may be performed. These may be added using the WSDL specification provided by the latter.

As described above in the architecture definition, the execution of the task activities associated to a workflow vertex may be performed by a device on which are deployed two BPEL processes, a public one and a private one. In the following, the communications between the private and public in the case of BPEL are described in more detail. The public process may manage the participation of a device in the global workflow while the internal process manages the execution of the task activities assigned to the device. Accordingly, a template for the internal process specification is provided and then the task activity which is the link between the two processes is specified.

Internal Process Specification in BPEL

As part of the present example architecture each device owns an internal process managing its embedded applications. This process may be defined by the device user and describes the operations the device is able to perform. It may be only invoked inside the device by the public process. Hence, the internal process definition may be organised to assure this role and divided into subsets Ti as described above. The process control function <pick> of BPEL enabling to make choices based on external events may therefore be used to represent this division. In that case the external events are the incoming task activities tin made by the public process and asking to perform specific (predetermined or predeterminable) operations. The BPEL code may be organized in different sections delimited by <onMessage> tags. Each section corresponds to a specific subset $T_i$ and is activated based on incoming task activities.

```
<process name="internalprocess">
    <pick createInstance="yes">
    <onMessage pL="publicprivateLink" pT="IPport"
operation="signature192" variable="input">
    <invoke.../>
    </onMessage>
    <onMessage pL="publicprivateLink" pT="IPport" operation =
"encryption192" variable = "input">
    <invoke.../>
    </onMessage> ...
<    /pick> ...
</process>
```

Task activity specification\

The specification of the workflow W may provide a general description on what a task activity consists in, its atomic definition would be specified at runtime when a device asked to perform vertex n generates the local part $W_n$. It is indeed the link between this general description and its associated subset $T_i$ of the internal process. The task activity may be an <invoke> activity including portType, partnerLink and operation proper to the internal process of a device. An example of task activity definition linked to the internal process described above is given in the following. Upon reception of r12, the device is asked to perform a signature. The signature 192 operation is invoked on the internal process with t12 defined in the public process. Internally, the private process then executes the section corresponding to the <onMessage> part where operation signature 192 is mentioned.

```
<sequence name="processsequence">
    <receive name= "r12" pL="12"pT="2portType"
operation="2receive" variable="input"/>
    <invoke name="t12" pL="publicprivateLink" pT="IPport"
operation="signature192" inputVariable="input"
outputVariable="output"/>
    <invoke name="r23" pL="23" pT="3portType"
operation="3receive" inputVariable="input"/> ...
</sequence>
```

Figure 9:
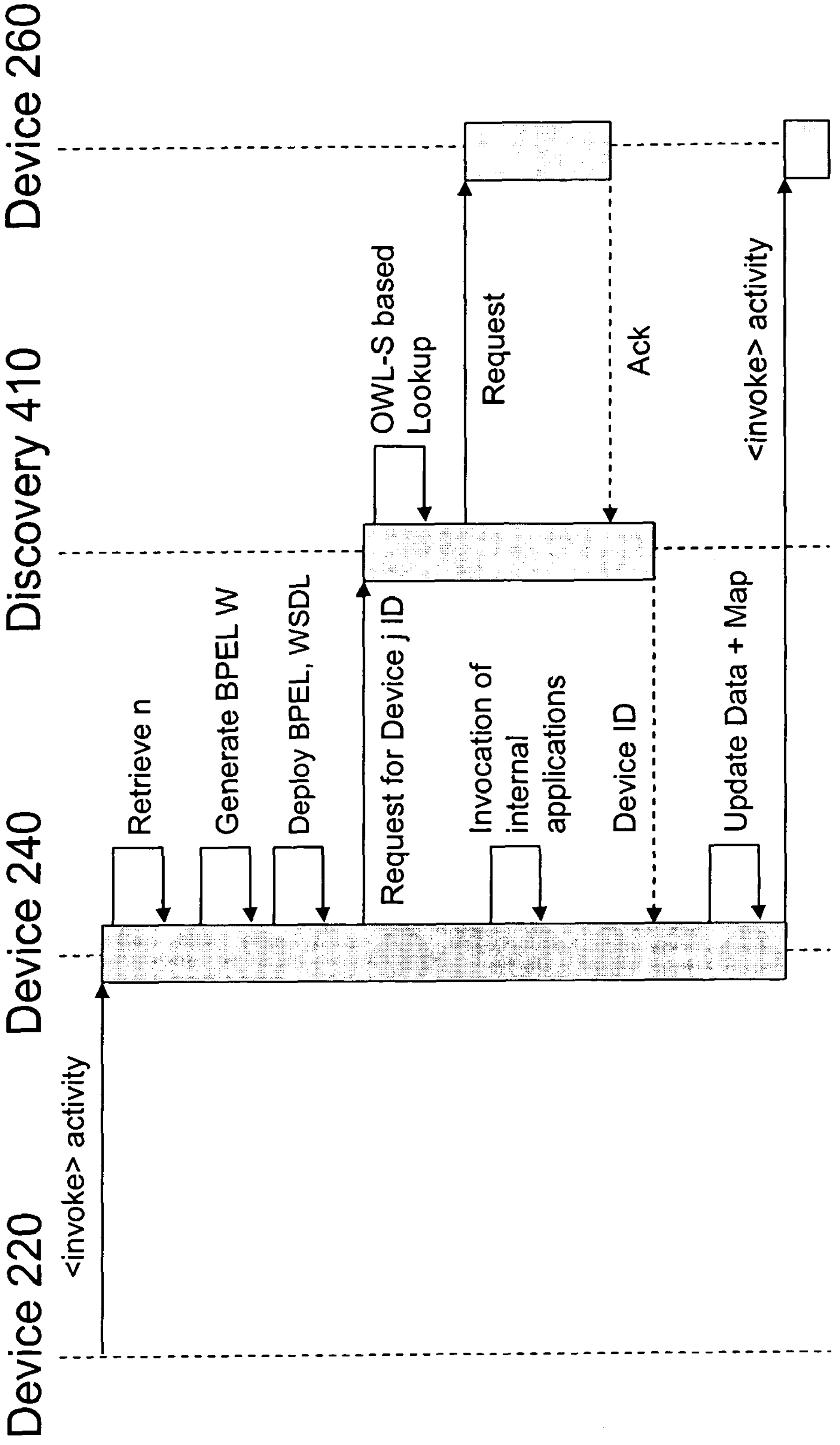
FIG. 9 shows a further example of an infrastructure sequence diagram.

FIG. 9 depicts a further example of the sequence diagram associated to the infrastructure. In comparison to the sequence diagram presented in FIG. 4, the following differences are noted:

Routing activities may be specified as BPEL invocations,

The generation of the $W_n$ may be performed with the procedure of deriving Wn (as described above), and/or The discovery procedure may be based on the comparison between the OWL-S definition of W and the one provided by the devices Apart from this, the same explanations apply as given when describing the sequence diagram in FIG. 4.

Ubiquitous computing (ubicomp, or sometimes ubiqcomp) integrates computation into the environment, rather than having computers which are distinct objects. Another term for ubiquitous computing is pervasive computing or computing in a pervasive environment. In the ubiquitous or pervasive computing devices are enabled to sense changes in their environment and to automatically adapt and act based on these changes based on user needs and preferences, wherein workflows should be advantageously distributed over the several distributed devices having different computing and communication capabilities and functions. In other words, in a pervasive environment communicating objects (as local devices) recognise each other and locate each other automatically, wherein the objects interact with each other particularly without any specific actions on the part of a user. Some simple examples of this type of behaviour include Global Positioning System (GPS-) equipped automobiles that give interactive driving directions and Radio Frequency IDentification (RFID) store checkout systems.

One or more processes within the pervasive environment may be implemented in digital electronic circuitry (including mobile devices, RFID-tags, transponders, smart tags, etc.), or in computer hardware, firmware, software, or in combinations of them which may form part of the pervasive environment. The architecture can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. A method operations of example embodiments can be performed by one or more programmable processors of the pervasive environment executing a computer program to perform functions of example embodiments by operating on input data and generating output. A method operations can also be performed by, and apparatus of example embodiments can be implemented as, special purpose logic circuitry, e.g., an FPGA (field programmable gate array) or an ASIC (application-specific integrated circuit) as a part of the pervasive environment. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer or processing device as a part of a pervasive environment are a processor for executing instructions and one or more memory devices for storing instructions and data. Generally, a computer or processing device as a part of a pervasive environment may also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry. To provide for interaction with a user, example embodiments can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. Example embodiments can be implemented in a computing system as a part of the pervasive environment that includes a back-end component, e.g., as a data server, or that includes a middleware component, e.g., an application server, or that includes a front-end component, e.g., a client computer having a graphical user interface or an Web browser through which a user can interact with an implementation of example embodiments, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet. The computing system or processing device as a part of a pervasive environment can include clients and servers: A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. Accordingly, other embodiments are within the scope of the following claims.

What is claimed is:

1. A method for executing a workflow on a device, the workflow comprising one or more task activities comprising actions performed by devices participating in the workflow and routing activities used to transfer control and data between devices, the workflow further comprising roles, wherein the method comprises:

receiving a message representing an incoming routing activity;

generating, using one or more processors, from the workflow a local part to be executed on the device, wherein generating the local part comprises:

modifying partner links in the workflow in order to specify coherent partner links;

deleting at least part or all task activities in the workflow that do not belong to the local part, while keeping dependencies specified by process control activities; and simplifying the routing and process control activities in the workflow;

executing task activities comprised by the generated local part on the device;

performing a request to a discovery service in order to obtain one or more identifications of one or more next devices by matching a role to capabilities of the one or more next devices, the role being a set of attributes of the one or more next devices, the set of attributes being used to execute next task activities associated with a next local part on the one or more next devices; and sending one or more messages representing a next routing activity to the one or more next devices thus identified.

2. The method for executing the workflow of claim 1, further comprising retrieving from the message a number of a local part of a workflow to be executed on the device.

3. The method for executing the workflow of claim 1, wherein the message comprises data, and the method includes updating the data.

4. The method for executing the workflow of claim 1, wherein the message comprises a mapping table between roles and devices, and the method includes updating the mapping table.

5. The method for executing the workflow of claim 1, further comprising translating the generated local part into standard Business Process Execution Language (BPEL).

6. The method for executing the workflow of claim 1, wherein the message representing the incoming routing activity comprises at least part of the following:

a workflow;

a unique instance identifier; and a number of a local part of a workflow to be executed by the workflow engine having received the message representing the incoming routing activity.

7. The method for executing the workflow of claim 6, wherein the message representing the incoming routing activity further comprises a mapping table between roles and devices.

8. The method for executing the workflow of claim 6, wherein the message representing the incoming routing activity further comprises data comprising at least one of a group of data types including control data, relevant data and application data.

9. The method for executing the workflow of claim 7, wherein the mapping table is complete at a workflow initialisation phase.

10. The method for executing the workflow of claim 7, wherein the mapping table is updated at each workflow vertex.

11. The method for executing the workflow of claim 1, wherein the identification comprises a unique instance identifier which comprises a random number plus an IP address of a workflow initiator.

12. The method for executing the workflow of claim 1, wherein a discovery of all devices is enabled at a workflow initialisation phase.

13. The method for executing the workflow of claim 1, wherein a discovery of devices is enabled along with a workflow instance.

14. A system comprising a computing device, and a workflow engine module for executing at least a portion of a workflow on the computing device, the workflow comprising one or more task activities comprising actions performed by devices participating in the workflow, routing activities used to transfer control and data between the devices and further comprising roles, the workflow engine module comprising:

a receiving component configured to receive a message representing an incoming routing activity;

a generating component, implemented using one or more processors, configured to generate from the workflow a local part to be executed on the computing device, wherein for generating the local part, the generating component is configured to:

modify partner links in the workflow in order to specify coherent partner links;

delete at least part or all task activities in the workflow that do not belong to the local part, while keeping dependencies specified by process control activities; and simplify the routing and process control activities in the workflow;

an executing component configured to execute task activities comprised by the generated local part on the device;

a performing component configured to perform a request to a discovery service in order to obtain one or more identifications of one or more next devices, the performing component including a matching component for matching a role to the capabilities of the one or more next devices, the role being a set of attributes of the next devices, the set of attributes being used to execute next task activities associated with a next local part on the one or more next devices; and a sending component configured to send one or more messages representing a next routing activity to the one or more next devices thus identified.

15. The system of claim 14, wherein the executing component, which is configured to execute task activities comprised by the generated local part, is further configured to execute an internal process and an external process and wherein the internal process communicates with device applications.

16. The system of claim 14, wherein the executing component configured to execute the task activities is Business Process Execution Language (BPEL) enabled.

* * * * *